United States Patent [19]

Faijersson

[11] Patent Number: 5,014,665

[45] Date of Patent: May 14, 1991

[54] R.P.M. - LIMITING CIRCUIT OF AN I.C. ENGINE

[75] Inventor: Sven I. Faijersson, Kållered, Sweden

[73] Assignee: Aktiebolaget Electrolux, Stockholm, Sweden

[21] Appl. No.: 532,955

[22] Filed: Jun. 4, 1990

[30] Foreign Application Priority Data

Jun. 12, 1989 [SE] Sweden .................................. 8902105

[51] Int. Cl.$^5$ ................................................ F02P 5/00
[52] U.S. Cl. ................................................... 123/329
[58] Field of Search ............... 123/329, 406, 418, 416, 123/417

[56] References Cited

U.S. PATENT DOCUMENTS 4,292,939 10/1981 Coatec et al. ......................... 123/329
4,437,442 3/1984 Yamaguchi ........................... 123/329
4,723,520 2/1988 Suzuki et al. ......................... 123/416
4,930,475 6/1990 Daikoku et al. ...................... 123/406

Primary Examiner—Raymond A. Nelli
Attorney, Agent, or Firm—Pearne, Gordon, McCoy & Granger

[57] ABSTRACT

The invention is a further development of an earlier arrangement of r.p.m. limitation (SE-P-452 355). The advantage of this invention is that the adjustment of pulse times is eliminated. The arrangement can be manufactured without cost demanding adjustment as the circuit is crystal-controlled which involves a great accuracy. As the r.p.m. increases, the pulse $t_2$ of the second flip-flop comes closer to the next ignition pulse of the ignition system and, at the limitation speed, $t_2$ begins to overlap the ignition pulse. The ignition time T is delayed and an ignition delay takes place with a subsequent limitation of the r.p.m.

4 Claims, 3 Drawing Sheets

R.P.M. - LIMITING CIRCUIT OF AN I.C. ENGINE

The present invention relates to an ignition circuit arrangement for i.c. engines with a claim for a limit of the top r.p.m. An excessive r.p.m. occurs when an engine runs under high load which suddenly disappears.

Within the art of ignition circuits there are priorly known protection arrangements against excessive r.p.m. which provide an ignition delay function when a determined r.p.m. of the engine has been exceeded, and consequently, they prevent an increase of the r.p.m. According to the Swedish patent publication SE 452 355 a limitation of the r.p.m. is effected by an arrangement containing a zero passage detector, a double monostable flip-flop and Darlington transistor parallelly connected to the ignition switch on the electronic ignition circuit. The known arrangement thus constitutes an addition to an existing ignition circuit, but it can also be integrated with such a circuit. Practical tests show, however, that this arrangement has some disadvantages as there are difficulties in adjusting the flip-flops to exact time for the ignition delay when the r.p.m. is excessive. Certain completions of the known arrangement have proved to give it a better function and the present invention just refers to such completions of the known arrangement according to the patent SE 452 355. It will thus be show in the following that the invention is a further development of the prior arrangement with monostable flip-flops. The advantage of the new version is that the adjustment of the pulse times of the flip-flops will be abolished which involves saved expenses. The invention includes counters controlled by a crystal oscillator which determines the pulse length most exactly With regard to the earlier arrangement further improvements have, however, been introduced and all of them are indicated in the characteristics of claim 1. As the invention is an improvement of the arrangement outlined in SE 452 355, that particular arrangement will now also be described for the sake of completeness.

Figure 1:
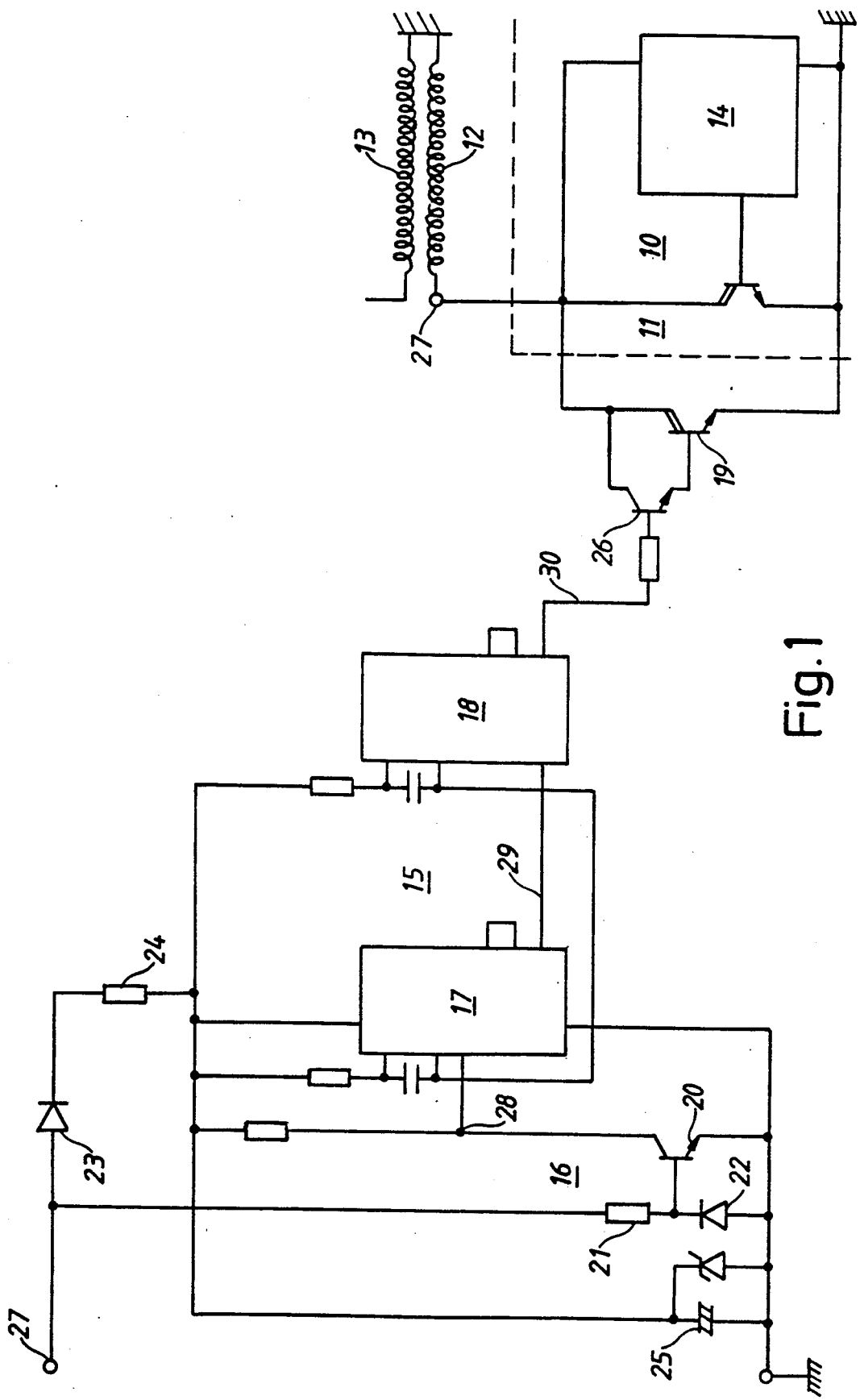
FIG. 1 shows a wiring diagram of the prior art arrangement.

The diagram according to FIG. 1 shows how the arrangement is used as addition to an existing ignition arrangement 10 which is, in this case, an electronic switch 11 in series with a primary coil 12. In order to obtain spark voltage in a secondary coil 13 it is necessary that the switch breaks the primary circuit at a well defined ignition time which is obtained by means of a control circuit 14. Through an additional circuit 15 the breaking can, however, be delayed or cancelled and this is effected by means of the circuitry to the left in the diagram. In that one there are three main functions: zero passage detector 16, double monostable flip-flops 17, 18 and a power transistor 19. The detector consists of a transistor 20, the base of which is connected to the primary coil via a resistance 21. The base is protected by a diode 22 from high negative voltage. A standard module 4358 contains two monostable flip-flops which are supplied via a diode 23, a resistance 24 and a capacitor 25. The power transistor gets its basic current from a control transistor 26 which is controlled by the module.

Figure 2:
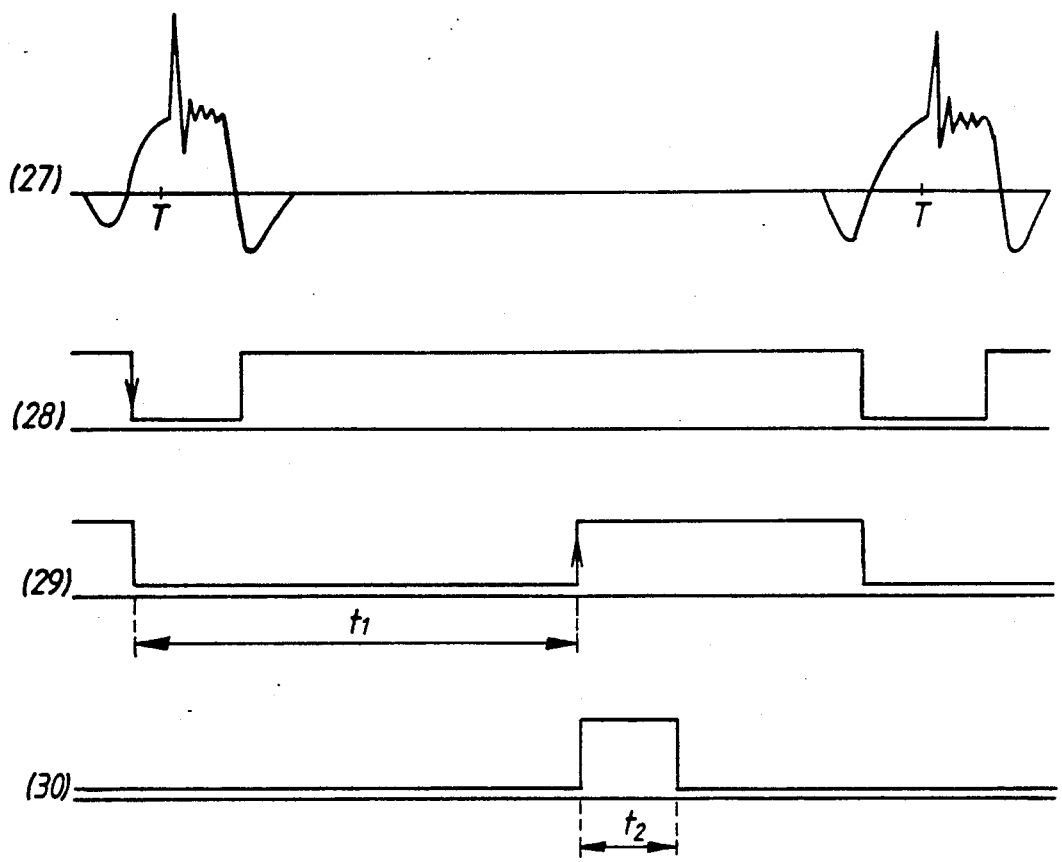
FIG. 2 shows a time schedule for voltages and pulses when the r.p.m. is lower than maximum.

The signal diagram shown in FIG. 2 indicates voltage curves in the arrangement at the voltage coil 27, at the connection point 28 between the detector and the first flip-flop, at the outlet 29 from the first flip-flop as well as at the outlet 30 from the second flip-flop. The curve at the point 27 derives from a magnetic ignition generator which provides a pulse for the generation of each spark. The time T between the pulses varies with the speed of the engine. At the beginning of the positive part of the pulse the detector gives a signal as then the transistor 20 begins to conduct. This signal consists, in the present case, of a negative voltage step and triggers the monostable flip-flop 18 which then generates a pulse on the outlet 29 with the pulse length $t_1$. While a pulse is going on, the flip-flop cannot be retriggered, nor can the pulse time be extended beyond $t_1$. The outlet of the first flip-flop 17 is connected to the inlet of the second flip-flop 18. That one is so connected that it will be triggered by a positive voltage step, and like the first one, it cannot be retriggered until the pulse going on during the time $t_2$ is finished. The outlet of the second flip-flop 18 is connected to the control transistor 26 which during the lapse of time $t_2$ keeps the power transistor 19 in a conductive state. This circuit includes the power transistor 19 which is parallelly connected to the existing ignition system that shall be completed with r.p.m. limitation. The power transistor then intervenes in the function of the ignition system when it comes to the r.p.m. above the upper limit and keeps the primary circuit closed when passing point T which constitutes the ignition time at that upper r.p.m. limit. The circuit is broken by the power transistor which then takes over the role as ignition transistor.

FIG. 2 shows the time schedule in a case when the engine speed is lower than the maximum r.p.m. which, according to the introduction, shall constitute the upper limit. The total of $t_1$ and $t_2$ is not sufficient to cover the time T for ignition and, therefore, the spark is discharged without influence of the additional circuit, i.e. the transistor 19 does not conduct right up to the time T, where the breaking takes place by means of the control from the control circuit 14 which is prepared for releasing the spark with a certain advance.

Figure 3:
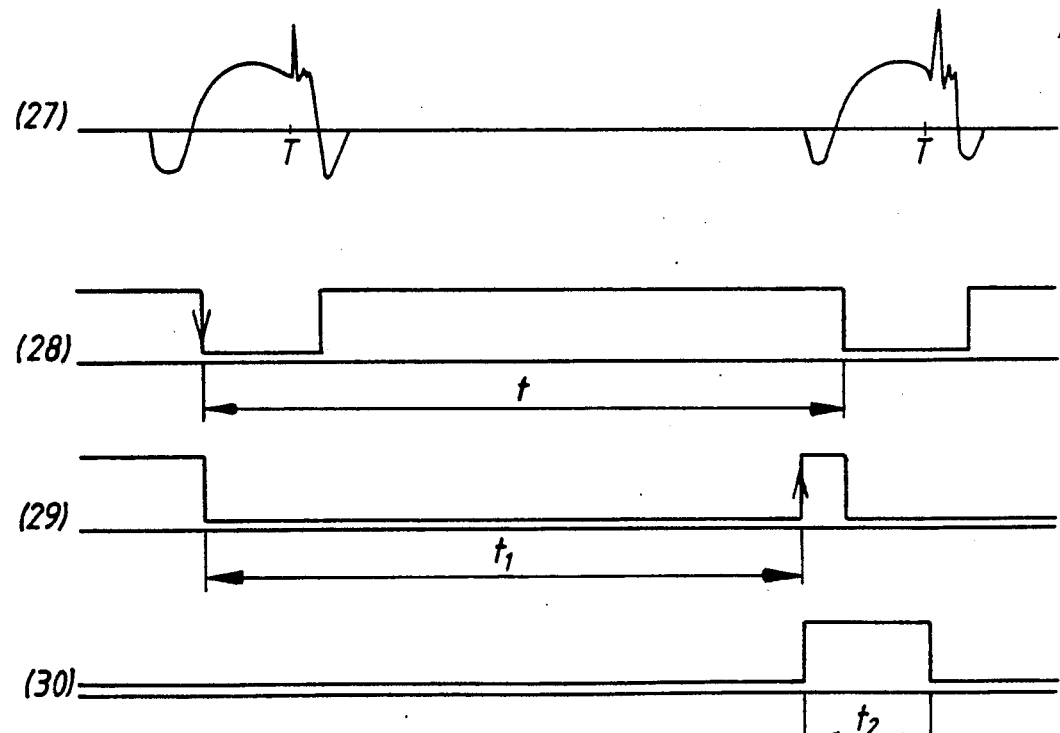
FIG. 3 shows a time schedule for voltages and pulses when the r.p.m. has reached maximum.

FIG. 3 shows a time schedule in a case when the engine speed has reached the maximum r.p.m. which would constitute the upper limit. At this high speed the ignition pulses are more frequent on the time axis and when the time between two spark discharges is shorter than $t_1 + t_2$, the power transistor is kept conductive when passing the time T by the control transistor 26 which involves that the time is delayed to a later ignition. The more the ignition is delayed, the more the torque of the engine is reduced so that it cannot maintain the high r.p.m. any longer.

The circuitry contains two flip-flops and that is an advantage as the flip-flop 17 has a shorter period time $t_1$ than the revolution time at the highest speed. It is thus always prepared for a new triggering at each zero passage independent of the overlapping of the point T by $t_2$. The problem of storing the time for the preceding zero passage is thus solved by the arrangement of two flip-flops. There is, however, much to gain by a changeover from the former two flip-flops into a digital system with counters control by a crystal oscillator. The system will be insensitive to temperature, pole distance and fly-wheel diameter when using the magnetic ignition apparatus referred to in this context.

Figure 4:
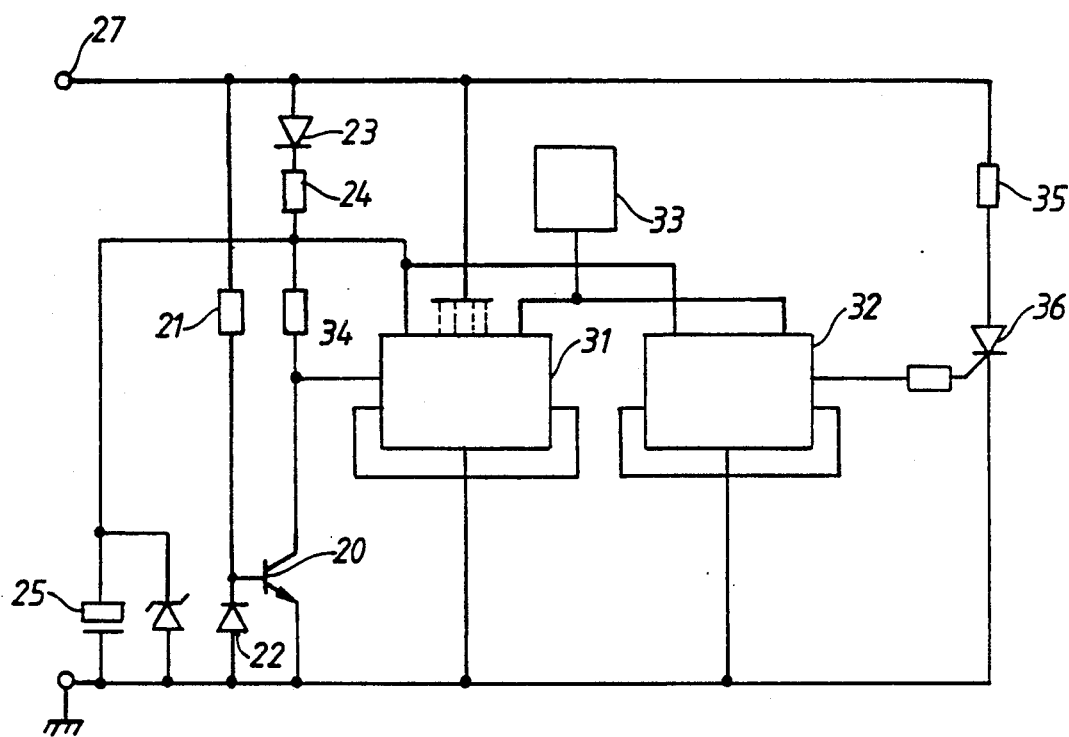
FIG. 4 shows a wiring diagram in respect of the invention.

As indicated above the flip-flops are of the type requiring manual adjustment of the pulse times $t_1$ and $t_2$ in respect of each ignition system. In FIG. 4 a variation of the circuitry is shown where the adjustment procedure has been eliminated thanks to application of counters 31, 32 according to the standard module 4516 and an external crystal oscillator 33 in conformity with a standard module 4069 which gives a constant frequency, e.g. 32.8 kHz to the inlets of the two counters. For the rest this circuit variation has also a zero passage detector 16 which starts the pulse $t_1$ at a trigger inlet 34 of the first counter.

The counter 31 can timely be set to count 98-164 oscillator pulses. The counter 32 has, in this case, been set to count 32 pulses. These numbers of pulses corresponds to the pulse times $t_1$ and $t_2$, respectively, as far as the earlier invention with flip-flops is concerned. The outlet of each counter gives a constant signal with the time $t_1$, $t_2$, respectively, while the counting is going on in each counter. The diagrams in FIGS. 2 and 3 are thus applicable to the variation in FIG. 4 as well. When a counting has been completed the counter is set on zero by means of a reset circuit.

The task in the system of the speed limiter is to prevent that a spark is generated when the r.p.m. is above maximum. This function could already be obtained as far as the circuit described in the indicated SE 442 355 is concerned, but then the circuit was provided with a transistor as an end circuit which involved disadvantages as (1) the transistor short-circuited the primary winding of the ignition coil resulting in a reduction of the supply voltage to the circuit so that the function could fail.
(2) Current passes the transistor during a period but, it is cut when the period is ended and a late spark might then be generated in the coil causing ignition of the gas at an unfavourable time.

The disadvantage 1 can be eliminated by introducing a resistance 35 at the end circuit as illustrated in FIG. 4. The supply voltage will be maintained on a sufficient level even when the end circuit is conducting. Compared to the earlier circuitry (FIG. 1) the transistor has been changed into a thyristor 36 which conducts the primary current as long as it exceeds the holding current of the thyristor. Thanks to this change a breaking that might generate a spark at an unfavourable time will not occur.

I claim:

1. R.p.m. limiting ignition circuit arrangement of an i.c. engine provided with two in series resettable, non-triggerable counters (31,32) of which the first one has counting to the pulse time $t_1$ and is triggered by a zero passage detector (16) sensing an induced primary voltage by magnetic induction in an ignition coil, and the second has counting to pulse time $t_2$ and is triggered by the end of the pulse time of the first counter and that the total times of the pulses $t_1$ and $t_2$ after said zero passage of a preceding engine revolution constitute the ignition time T at a maximum speed to which a limitation is determined, which second counter's outlet is connected to a switch (36) for the purpose of changing over this one when the tie $t_2$ owing to exceeding r.p.m. overlaps the time T, which switch is directly or indirectly via a control component (26) connected in parallel to an ignition switch of the ignition circuit, characterized in that the counters are adapted to be controlled by a common crystal oscillator (33).

2. Ignition circuit arrangement according to claim 1, characterized in that the switch (36) consists of a thyristor.

3. Ignition circuit arrangement according to claim 2, characterized in that the thyristor is connected in series with a resistance (35).

4. Ignition circuit arrangement according to claim 1, characterized in that the resetability of the counters is made in the form of a reset circuit on each one, which sets the counters on zero after the pulse times $t_1$ and $t_2$, repsectively.

* * * * *